US010809146B2

(12) United States Patent
Weidner (10) Patent No.: US 10,809,146 B2
(45) Date of Patent: Oct. 20, 2020

(54) LEAKAGE DETECTION DEVICE AND WATER SYSTEM COMPRISING A LEAKAGE DETECTION DEVICE

(71) Applicant: Honeywell Technologies Sarl, Rolle (CH)

(72) Inventor: Kurt Weidner, Aalen (DE)

(73) Assignee: Honeywell Technologies Sarl, Rolle (CH)

(*) Notice: Subject to any disclaimer, the term of this patent is extended or adjusted under 35 U.S.C. 154(b) by 338 days.

(21) Appl. No.: 15/498,217

(22) Filed: Apr. 26, 2017

(65) Prior Publication Data
US 2017/0315015 A1 Nov. 2, 2017

(30) Foreign Application Priority Data

Apr. 27, 2016 (EP) ..................................... 16167273
Apr. 10, 2017 (EP) ..................................... 17165660

(51) Int. Cl.
*G01M 3/28* (2006.01)
*G01L 9/00* (2006.01)

(52) U.S. Cl.
CPC ........... *G01M 3/2815* (2013.01); *G01L 9/007* (2013.01); *G01L 9/0072* (2013.01); *G01L 9/0076* (2013.01); *G01L 9/0089* (2013.01); *G01M 3/2846* (2013.01); *G01M 3/2876* (2013.01)

(58) Field of Classification Search
CPC ..... G01L 9/007; G01L 9/0072; G01L 9/0076; G01L 9/0089; G01M 3/2815; G01M 3/2846; G01M 3/2876
See application file for complete search history.

(56) References Cited

U.S. PATENT DOCUMENTS 4,142,851 A 3/1979 Handa
4,450,409 A 5/1984 Castleman et al.
(Continued)

FOREIGN PATENT DOCUMENTS

EP 2058442 A2 5/2009
WO 2015064269 A1 5/2015

OTHER PUBLICATIONS

The Extended European Search Report for EP Application No. 17165660.6 dated Sep. 27, 2017.
(Continued)

*Primary Examiner* — Randy W Gibson
*Assistant Examiner* — Gedeon M Kidanu
(74) *Attorney, Agent, or Firm* — Shumaker & Sieffert, P.A.

(57) ABSTRACT

A leakage detection device for detecting water leakage in a water pipe of a water system after a stop valve of the water system is closed. The leakage detection device may be part of a stop valve, and may include an interior chamber connectable to the water pipe in such a way so as to receive a stagnation volume of the water when the water flow through the water pipe is stopped by the stop valve. An actuation element provides a force acting on a diaphragm or a piston in the direction of the first interior chamber and against or into the stagnation volume of water. If water leakage is present in the water pipe, the diaphragm or piston will move under the applied force to compensate for the leakage in the water pipe. A sensor unit may detect water leakage in the water pipe based on the movement.

18 Claims, 4 Drawing Sheets

(56) References Cited

U.S. PATENT DOCUMENTS

| | | | | |
|---|---|---|---|---|
| 4,518,955 A | * | 5/1985 | Meyer | F17D 5/02 340/605 |
| 5,085,576 A | | 2/1992 | Bonne et al. | |
| 5,952,823 A | | 9/1999 | Nyce et al. | |
| 6,707,290 B2 | | 3/2004 | Nyce et al. | |
| 7,114,516 B2 | | 10/2006 | Ito | |
| 8,316,695 B2 | * | 11/2012 | Jarvie | G01M 3/2892 137/398 |
| 8,740,177 B2 | * | 6/2014 | Walker | F16K 7/17 251/30.01 |
| 9,423,334 B2 | * | 8/2016 | Anderson | F16K 51/00 |
| 2002/0101355 A1 | * | 8/2002 | Young | G01F 1/26 340/606 |
| 2005/0224118 A1 | * | 10/2005 | Tornay | F17D 5/06 137/624.11 |
| 2007/0068225 A1 | * | 3/2007 | Brown | F16K 37/0075 73/40.5 A |
| 2007/0163331 A1 | * | 7/2007 | Jarvie | G01M 3/2892 73/49.2 |
| 2010/0095744 A1 | | 4/2010 | Johnson | |
| 2014/0260549 A1 | * | 9/2014 | Dudar | F02M 65/006 73/40 |
| 2016/0260312 A1 | | 9/2016 | Hazzard et al. | |
| 2016/0279961 A1 | | 9/2016 | Nukui et al. | |
| 2017/0023424 A1 | | 1/2017 | Duff et al. | |

OTHER PUBLICATIONS

The Extended European Search Report for EP Application No. 16167273.8 dated Nov. 7, 2016.

Response to Extended Search Report dated Sep. 27, 2017 and Communication Pursuant to Rule 69 of the EPC dated Nov. 6, 2017, from counterpart European Application No. 17165660.6, filed Apr. 25, 2018, 19 pages.

* cited by examiner

LEAKAGE DETECTION DEVICE AND WATER SYSTEM COMPRISING A LEAKAGE DETECTION DEVICE

This application claims priority to European Patent Application Serial No. 17 165 660.6, filed Apr. 10, 2017, which claims priority to European Patent Application Serial No. 16 167 273.8, filed Apr. 27, 2016, both of which are incorporated herein by reference.

TECHNICAL FIELD

The present patent application relates to a leakage detection device and to a water system comprising such a leakage flow detection device.

BACKGROUND

In water systems it is common practice that a stop valve is positioned within a water pipe of the water system. When the stop valve is opened, the water can flow through the water pipe in which the stop valve is positioned. When the stop valve is closed, the water flow through the water pipe is stopped. When the stop valve is closed, it is desired to detect if there is a leakage within the water system. A leakage in a water installation wastes water needed for human consumption and can cause serious damage. Most of the leakages are not recognized early because the detection of small leakages is difficult and expensive. For the time being, is it not possible to provide a water leakage detection that allows the detection of small leakages in a simple, reliable and cost-effective manner.

U.S. Pat. No. 4,518,955 A1 discloses an apparatus for detecting leakage in a fluid conduit system. The apparatus requires a flow through the detecting leakage apparatus to detect the leakage. The apparatus for detecting leakage of U.S. Pat. No. 4,518,955 A1 needs to be mounted in line with a fluid pipe. US 2010/0095744 A1 discloses a leak detector. This leak detector also needs a fluid flow through the same to detect the leakage. US 2007/0163331 A1 discloses a leak detector to detect leakage in fuel tanks.

SUMMARY

Against this background, a novel leakage detection device according to claim 1 is provided.

The novel leakage detection device comprises a first interior chamber, said first interior chamber being connectable to a water pipe in such a way that the first interior chamber provides a stagnation volume for the water thereby receiving a stagnation volume of the water when a stop valve being positioned within the water pipe is closed.

The novel leakage detection device further comprises a second interior chamber, said second interior chamber being separated from the first interior chamber by a diaphragm or by a piston.

The novel leakage detection device further comprises an actuation element providing a force acting on the diaphragm or the piston in such a way that the force provided through said actuation element tends to move the diaphragm or the piston in the direction of the first interior chamber against or into the stagnation volume.

The novel leakage detection device further comprises a sensor unit for sensing a parameter being representative of the movement of the diaphragm or the piston and/or sensing a parameter being representative of the force provided by the actuation element. The sensor unit comprises a sensor element for sensing the parameter being representative of movement of the diaphragm or the piston and/or the parameter being representative of the force provided by the actuation element. The sensor unit further comprises a processing element, wherein the processing element is adapted to analyse the parameter being representative of movement of the diaphragm or the piston and/or the parameter being representative of the force provided by the actuation element as a function of time, wherein the processing element detects from the time-dependent parameter being representative of movement of the diaphragm or the piston and/or from the time-dependent parameter being representative of the force provided by the actuation element a water leakage or a regular water consumption.

The novel leakage detection device takes into account that water is not compressible, and that leakages can be detected by measuring the change of a water stagnation volume. If a stop valve assigned to the water pipe is closed thereby stopping the water flow through the water pipe and if there is no leakage in the water pipe, the stagnation volume will not change significantly.

The novel leakage detection device is not able to detect leakage when water flows through the water pipe. The novel leakage detection device makes use of a stagnation volume when the water flow through the water pipe is stopped.

The novel leakage detection device uses the principle of diaphragms or pistons pressed by an actuation element like a spring or an elastomer cushion or an air cushion or a drive unit or the like against the stagnation volume. In case of a leakage, the stagnation volume will become smaller and the diaphragm or piston will be moved, especially pushed, against or into the stagnation volume to compensate the leakage. The invention allows a distinction in a simple, reliable and cost-effective way between water leakage and regular water consumption.

The processing element is adapted to analyse the parameter being representative of movement of the diaphragm or the piston and/or the parameter being representative of the force provided by the actuation element as a function of time in such a way that if the rate or velocity of the change of the or each parameter is below a first threshold, the processing element detects that neither a water leakage nor a regular water consumption is present. If the rate or velocity of the change of the or each parameter is above the first threshold but below a second threshold, the processing element detects that a water leakage is present. If the rate or velocity of the change of the or each parameter is above the second threshold, the processing element detects that a regular water consumption. This allows a distinction in a simple, reliable and cost-effective way between water leakage and regular water consumption.

Preferably, said second chamber accommodates a stem connected to the diaphragm or the piston, wherein the sensor unit senses a parameter being representative of the movement of the diaphragm or the piston, and thus the movement of the stem, and detects from the movement of the stem the water leakage. Such a leakage detection device provides a leakage detection in a simple, reliable and cost-effective manner.

According to a preferred embodiment of the invention, the actuation element acting on the diaphragm or the piston is provided by a compressible element like a spring or an elastomer cushion or an air cushion accommodated within the second interior chamber. The sensor unit senses the movement of the stem and detects from the movement of the stem the water leakage. If a spring is used as a compressible actuation element, a first end of the spring is preferably supported against the diaphragm or the piston, and a second end of the spring is preferably supported against a housing of the novel leakage detection device. In this case, the actuation element acts directly on the diaphragm or the piston. Such a leakage detection device provides a leakage detection in a simple, reliable and cost-effective manner.

According to another preferred embodiment of the invention, the actuation element acting on the diaphragm or the piston is provided by a drive unit driven by a control variable, e.g. by an electrical current, wherein said control variable driving the drive unit is used as a parameter being representative of the force provided by the actuation element. Such a drive unit can act directly on the diaphragm or piston. Alternatively, such a drive unit can act indirectly on the diaphragm or piston, especially through the stem. The parameter being representative of the movement of the diaphragm or the piston, especially the movement of the stem, and/or the parameter being representative of the force provided by the actuation element, can be used to detect the water leakage. These parameters can be used alone or in combination with each other for the water leakage detection.

BRIEF DESCRIPTION OF THE DRAWINGS

Preferred developments of the invention are provided by the dependent claims and the description which follows. Exemplary embodiments are explained in more detail on the basis of the drawing, in which:

DESCRIPTION

The present application relates to a water leakage detection device and to a water system, especially to a potable water system, comprising such a water leakage detection device.

Figure 3A:
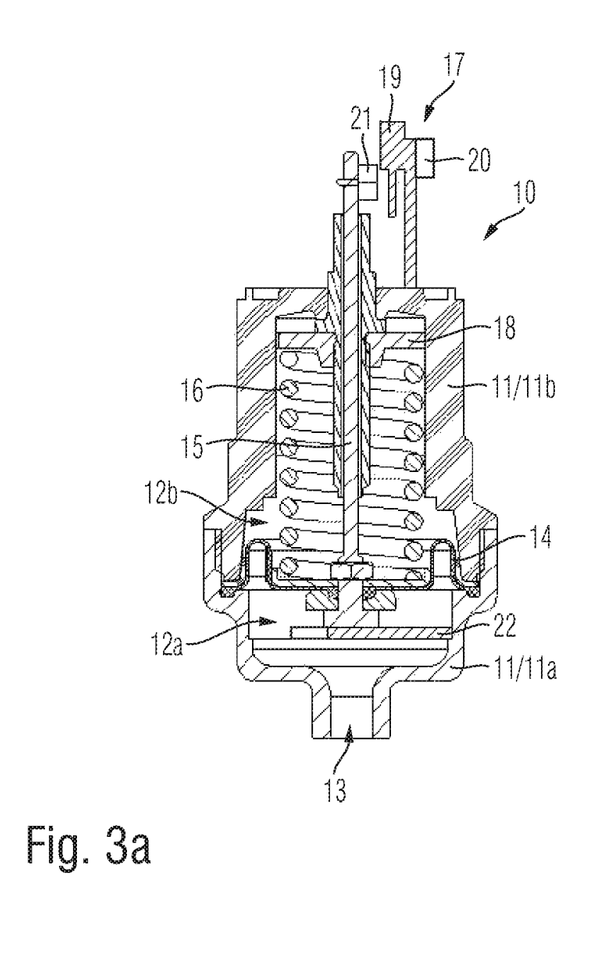
FIG. 3a shows a cross section through another leakage detection device in a first status of the same.
Figure 3B:
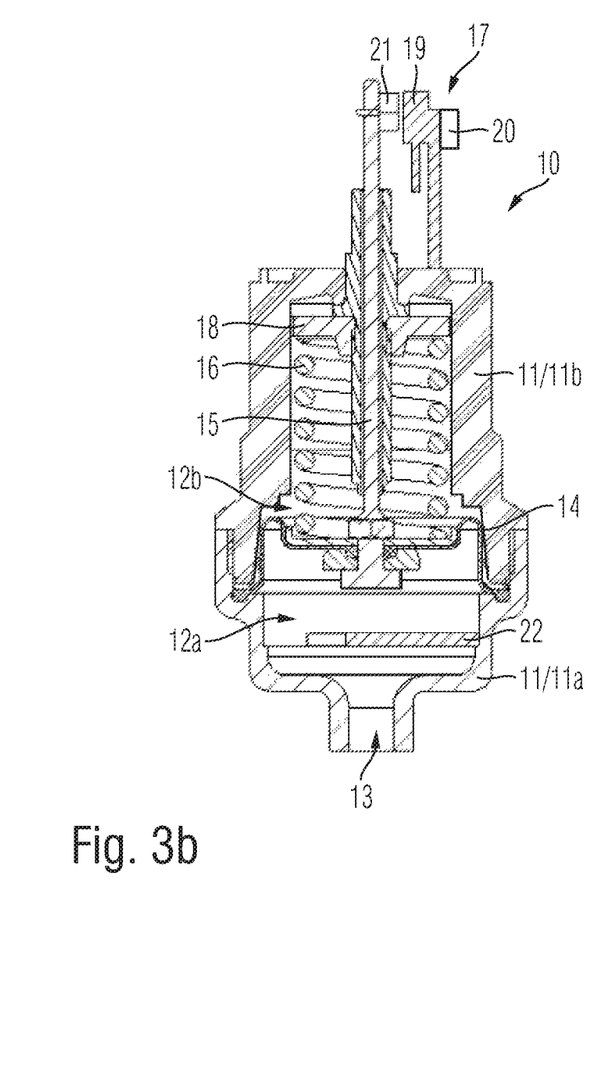
FIG. 3b shows the leakage detection device of FIG. 3a in a second status of the same.

FIGS. 3a, 3b show a water leakage detection device 10 for detecting a water leakage in a water pipe of a water system according to an embodiment of the inventions. The leakage detection device 10 is able to detect leakage when a stop valve (not shown) being positioned within the water pipe (not shown) upstream of the leakage detection device 10 is closed.

A stop valve is also often called a blocking valve or a shut off valve. Such a stop valve stops the water flow in both directions when the same is closed.

The leakage detection device 10 comprises a housing 11. The housing 11 has a first housing part 11a and a second housing part 11b. Through the first housing part 11a the leakage detection device 10 is connectable to a water pipe (not shown).

The leakage detection device 10 comprises a first interior chamber 12a. The housing 11, especially the first housing part 11a, provides said first interior chamber 12a. Said first interior chamber 12a is connectable to the water pipe by an opening 13 of the first housing part H a provided by a connection thread. The first interior chamber 12a is connectable to the water pipe in such a way that the first interior chamber 12a provides a stagnation volume for the water when the stop valve (not shown) being positioned within the water pipe (not shown) is closed. The stagnation volume provided by the first interior chamber 12a can also be called shut-off volume.

The leakage detection device 10 further comprises a second interior chamber 12b. The housing 11, especially the second housing part 11b, provides said second interior chamber 12b. The second interior chamber 12b is separated from the first interior chamber 12a by a diaphragm 14. In the embodiment of FIGS. 3a, 3b, the second interior chamber 12b accommodates a stem 15 connected to the diaphragm 14. A first section of the stem 15 is accommodated within the second interior chamber 12b. A second, opposite section of the stem 15 extends from the second interior chamber 12b of the housing 11 into the exterior of the housing 11. In the embodiment of FIGS. 3a, 3b, the second interior chamber 12b further accommodates an actuation element 16, namely in the embodiment of FIGS. 3a, 3b a compressible actuation element 16 provided by a spring, acting on the diaphragm 14. Instead of a spring the second interior chamber 12b can accommodate a different compressible actuation element. e.g. an elastomer or an air cushion or the like.

The compressible actuation element 16 provided e.g. by the spring, acts in such a way on the diaphragm 14 that a force provided through said compressible actuation element 16 tends to move or push the diaphragm 14 in the direction of the first interior chamber 12a and thereby against or into the stagnation volume provided by said first interior chamber 12a. The stagnation volume is partially delimited by the diaphragm 14.

A first end of the compressible actuation element 16 provided by the spring is supported against the diaphragm 14 and a second end of the compressible actuation element 16 provided by the spring is supported against the housing 11, namely against a plate 18 of the housing 11 positioned within the second interior chamber 12b. The actuation element 16 provided by the spring is acting directly on the diaphragm 14.

The leakage detection device 10 further comprises a sensor unit 17 sensing the movement of the stem 15 and detecting from the movement of the stem 15 the water leakage. The movement of the stems 15 is used as parameter being representative of the movement of the diaphragm 14.

The sensor unit 17 comprises a sensor element 19 for sensing the movement of the stem 15 which is used as parameter being representative of movement of the diaphragm 14.

In the embodiment shown in FIGS. 3a. 3b, the sensor element 19 is preferably provided by a Hall sensor. The sensor element 19 can also be provided by a Reed-Contact sensor or a photocell sensor or potentiometer sensor or micro switch or an inductive sensor or a capacitive sensor or the like.

The sensor element 19 which is in the shown embodiment provided by a Hall sensor senses the movement of a magnetic element 21 attached to the stem 15. If instead of a Hall sensor a different sensor is used, the element 21 does not need to be magnetic. If e.g. a photocell sensor is used, the element 21 can be provided by a reflector element.

The sensor unit 17 further comprises a processing element 20, wherein the processing element 20 is adapted to analyse the movement of the stem 15 which is used as parameter being representative of movement of the diaphragm 14 as a function of time, wherein the processing element 20 detects from said time-dependent a water leakage or a regular water consumption.

The processing element 20 is a microcontroller or the like detecting from the signal provided by the sensor element 19 the water leakage.

The processing element 20 is adapted to analyse the movement of the stem 15 which is used as parameter being representative of movement of the diaphragm 14 as a function of time in such a way that if the rate or velocity of the change of said time-dependent parameter is below a first threshold, the processing element 20 detects that neither a water leakage nor a regular water consumption is present. However, if the rate or velocity of the change of said time-dependent parameter is above the first threshold but below a second threshold, the processing element 20 detects that a water leakage is present. Further, if the rate or velocity of the change of said time-dependent parameter is above the second threshold, the processing element 20 detects a regular water consumption.

If the rate of change or velocity of the movement of the stem 15 within a defined time interval is below a first threshold, the processing element 20 detects that neither a water leakage nor a regular water consumption is present.

If the rate of change or velocity of the movement of the stem 15 within the defined time interval is above the first threshold but below a second threshold, the processing element 20 detects that a water leakage is present.

If the rate of change or velocity of the movement of the stem 15 within the defined time interval is above the second threshold, the processing element 20 detects that a regular water consumption.

In other words, if during a defined time interval a relatively large movement of the stem 15 corresponding to a relative fast movement of the stem 15 is sensed, the processing element 20 will detect a regular water consumption. However, if during the defined time interval a relatively small movement of the stein 15 corresponding to a relative slow movement of the stem 15 is sensed, the processing element 20 will detect the water leakage. If there is almost no movement of the stem 15 within the defined time interval, neither a regular water consumption nor a water leakage is detected.

FIG. 3b shows the leakage detection device 10 in a status in which a stop valve (not shown) assigned to a water pipe (not shown) is closed and in which no water leakage is present. In such a situation the water within the stagnation volume provided by the first interior chamber 12a pushes the stem 15 via the diaphragm 14 into the upper position of FIG. 3b, namely against the force provided by the actuation element 16 provided by the spring. If the stop valve (not shown) assigned to a water pipe (not shown) is closed and if water leakage is present, the water will flow out of the stagnation volume and into the water pipe though the opening 13. In this situation, the diaphragm 14 and the stem 15 will be pressed or pushed via the actuation element 16 provided by the spring into the first interior chamber 12a which will cause the same to move from the position of FIG. 3b into the position of FIG. 3a. As can been seen, a stop member 22 positioned within the first interior chamber 12a limits that movement of the stem 15 being attached with one end of the same to the diaphragm 14. As can been seen, the movement of the stem 15 changes the relative position of the element 21 being attached to the opposite end of the stem 15 relative to the sensor element 19 thereby causing a change in the signal provided by the sensor element 19.

The invention takes into account that water is not compressible, and that a leakage can be detected by measuring the change of the water stagnation volume. The embodiment of FIGS. 3a, 3b uses a diaphragm 14 pressed via the actuation element 16 provided by the spring against the stagnation volume. A stem 15 is connected to the diaphragm 14.

If there is a water leakage, the stagnation volume will become smaller and the diaphragm 14 together with the stem 15 will be pushed via the actuation element 16 provided by the spring to compensate the water leakage. It is not necessary to know the leakage exactly. It is more important to detect if leakage is present or not. So, if there is no water leakage present, the water within the stagnation volume provided by the first interior chamber 12a will stay within the first interior chamber 12a and the stagnation volume is constant. If a water leakage is present, the water within the stagnation volume provided by the first interior chamber 12a will flow out of the first interior chamber 12a and the stagnation volume is not constant but will become smaller. The diaphragm 14 together with the stem 15 will be pushed by the actuation element 16 to compensate the water leakage.

The leakage detection device 10 is preferably adjustable. To provide an adjustable leakage detection device 10, it is possible to attach the element 21 to the stem 15 in such a way that the mounting position of said element 21 at the stem can be changed. By such a position change of the element 21, the sensitivity of the leakage detection device can be influenced, meaning that the change of leakage volume which results in a leakage detection can be adjusted. This adjustment can easily be done because the element 21 is positioned outside of the housing 11. Further on, it is possible to adjust the sensitivity of the leakage detection device 10 in a different way. The processing element 20 is adapted to analyse the movement of the stem 15 as a function of time. The sensitivity can be adjusted by adjusting a time interval and/or by adjusting a defined movement of the stem 15 which leads to a leakage detection. It shall be assumed that a water leakage becomes detected if an amount of the position change of the stem 15 within the defined time interval is above a first threshold but below a second threshold. If said defined amount of the position change of the stem 15 which leads to a detection of a water leakage and thereby the first threshold is decreased, the sensitivity of the leakage detection device 10 is increased. It is also possible to adjust the sensitivity by adjusting the defined time interval.

Figure 1A:
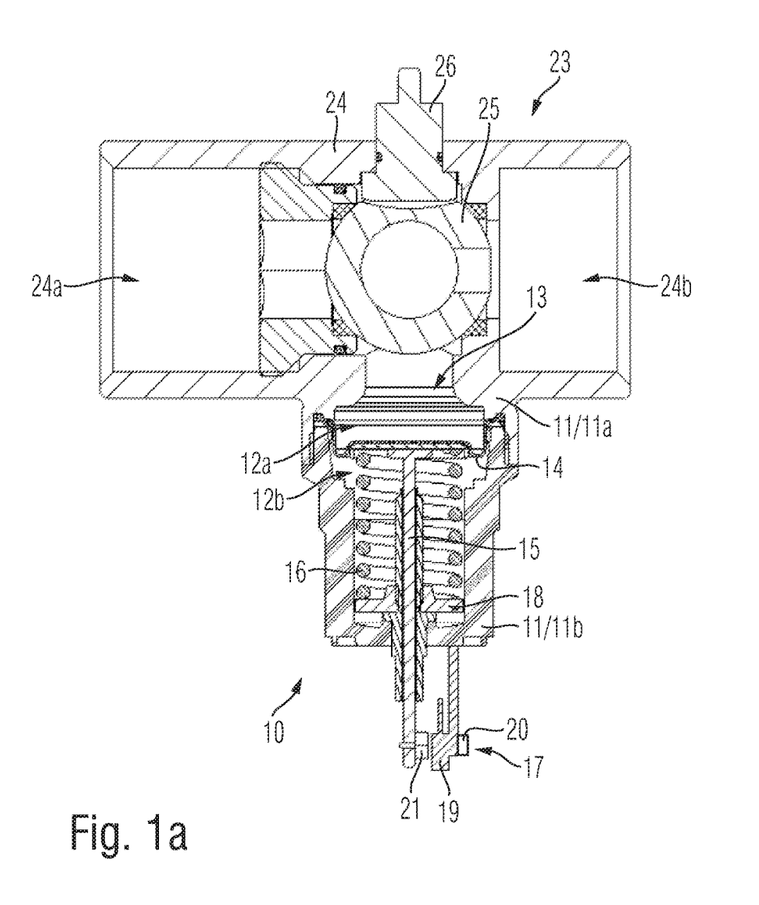
FIG. 1a shows a cross section through a leakage detection device being an integral element of a stop valve in a first status of the leakage detection device when the stop valve is closed.
Figure 1B:
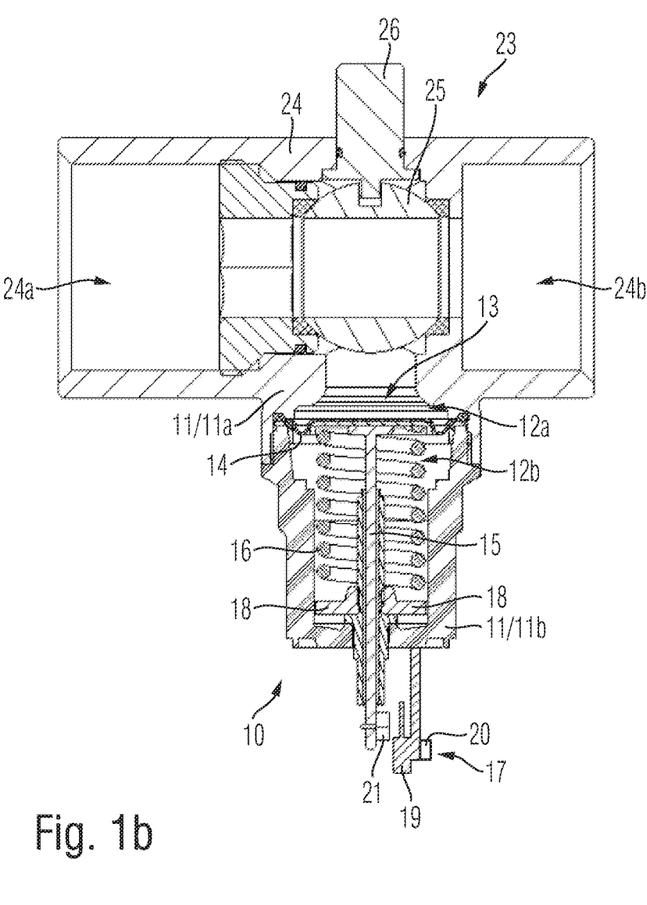
FIG. 1b shows the assembly of FIG. 1a in a second status of the leakage detection device when the stop valve is opened.

FIGS. 1a, 1b show a leakage detection device 10 for detecting a water leakage in a water pipe of a water system according to another embodiment of the invention.

The water leakage detection device 10 of FIGS. 1a, 1b is an integral element of a stop valve 23. In the embodiment of FIGS. 1a, 1b, the first housing part 11a with the first interior chamber 12a providing the stagnation volume is provided by a valve housing 24 of the stop valve 23. In FIG. 1*b*, the stop valve 23, which is provided by a ball valve, is opened allowing a water flow through the same from an inlet chamber 24*a* to an outlet chamber 24*b*. In FIG. 1*a*, the stop valve 23 is closed stopping a water flow through the same. In the status of FIG. 1*a*, the leakage detection device 10 can be used to detect leakage in the water system, namely in a water pipe to which the first interior chamber 12*a* is connected though the opening 13 and the outlet chamber 241) of the stop valve 23. FIGS. 1*a*, 1*b* show with valve body 25 of the stop valve 23 a ball member which can be manually actuated by a handle 26.

If there is a leakage, the stagnation volume within the first interior chamber 12*a* will become smaller, and the diaphragm 14 together with the stem 15 will be pushed via the actuation element 16 provided e.g. by the spring to compensate the water leakage. If no leakage is present, the water within the stagnation volume provided by the first interior chamber 12*a* will stay within the first interior chamber 12*a* and the stagnation volume is constant. If a leakage is present, the water within the stagnation volume provided by the first interior chamber 12*a* will flow out of the first interior chamber 12*a* and the stagnation volume is not constant but will become smaller. The diaphragm 14 together with the stem 15 will be pushed by the actuation element 16 provided e.g. by the spring to compensate the water leakage. This causes the time-dependent movement of the stem 15 and thereby of the element 21 relative to the sensor element 19. The movement of the element 21 relative to the sensor element 19 is sensed by the sensor unit 17, wherein on basis of said time-dependent movement the water leakage becomes detected.

Figure 2A:
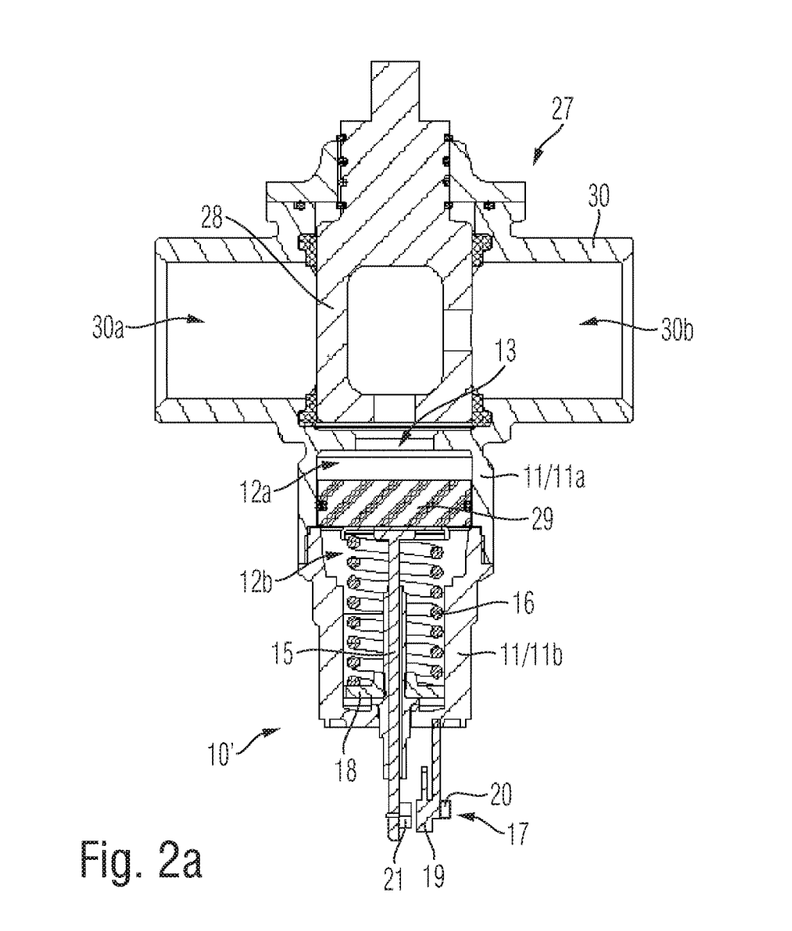
FIG. 2a shows a cross section through another leakage detection device being an integral element of a stop valve in a first status of the leakage detection device when the stop valve is closed.
Figure 2B:
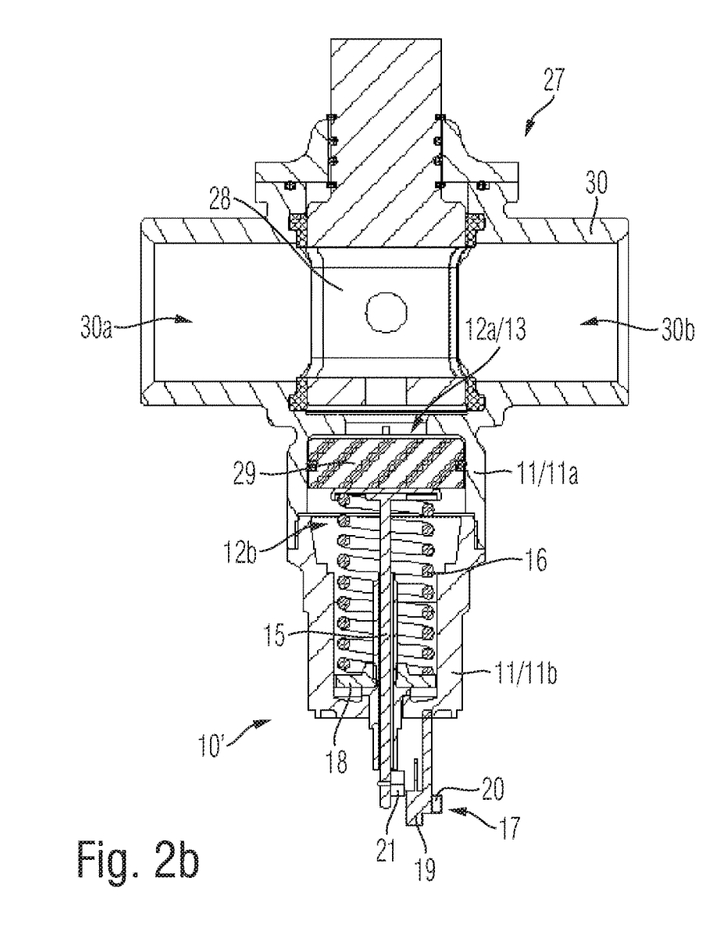
FIG. 2b shows the assembly of FIG. 2a in a second status of the leakage detection device when the stop valve is opened.

FIGS. 2*a*, 2*b* show a leakage detection device 10' for detecting a water leakage in a water pipe of a water system according to another embodiment of the invention. The water leakage detection device 10' of FIGS. 2*a*, 2*b* is an integral element of a stop valve 27. In the embodiment of FIGS. 2*a*, 2*b*, the first housing part 11*a* with the first interior chamber 12*a* providing the stagnation volume is provided by a valve housing 30 of the stop valve. In FIG. 2*b*, the stop valve 27 is opened allowing a water flow through the same from an inlet chamber 30*a* to an outlet chamber 30*b*. In FIG. 2*a*, the stop valve 27 is closed, stopping a water flow through the same. In the status of FIG. 2*a*, the leakage detection device 10' can be used to detect leakage in the water system, namely in a water pipe to which the first interior chamber 12*a* is connected through the opening 13 and the outlet chamber 30*b* of the stop valve 27. The leakage detection device 10' shown in FIGS. 2*a*, 2*b* differs from the leakage detection devices 10 shown in FIGS. 1*a*. 1*b* and in FIGS. 3*a*, 3*b* by the use of a piston 29 instead of the diaphragm 14. The movement of the piston 29 is limited by a stop member being an integral element of the valve housing 30 providing the housing part 11*a*.

If there is a leakage, the stagnation volume within the first interior chamber 12*a* will become smaller and the piston 29 together with the stem 15 will be pushed via the actuation element 16 provided e.g. by the spring to compensate the water leakage. If no leakage is present, the water within the stagnation volume provided by the first interior chamber 12*a* will stay within the first interior chamber 12*a* and the stagnation volume is constant. If a leakage is present, the water within the stagnation volume provided by the first interior chamber 12*a* will flow out of the first interior chamber 12*a* and the stagnation volume is not constant but will become smaller. The piston 29 together with the stem 15 will be pushed by the actuation element 16 provided e.g. by the spring to compensate water leakage. This causes the time-dependent movement of the stem 15 and thereby of the element 21 relative to the sensor element 19. The movement of the element 21 relative to the sensor element 19 is sensed by the sensor unit 17, wherein on basis of said time-dependent movement the leakage becomes detected.

Figure 4A:
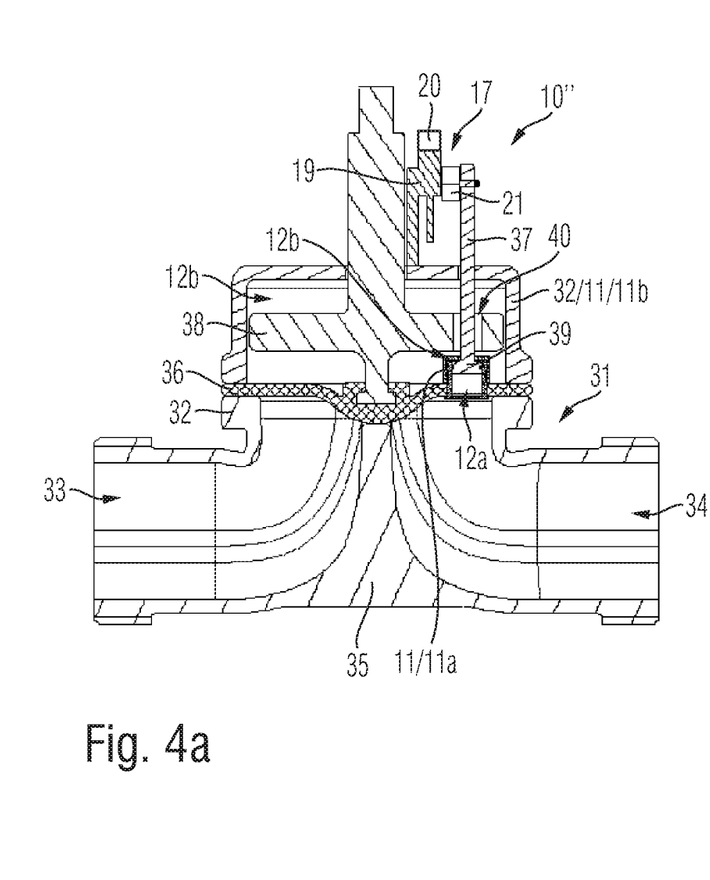
FIG. 4a shows a cross section through another leakage detection device being an integral element of a stop valve in a first status of the leakage detection device when the stop valve is closed.
Figure 4B:
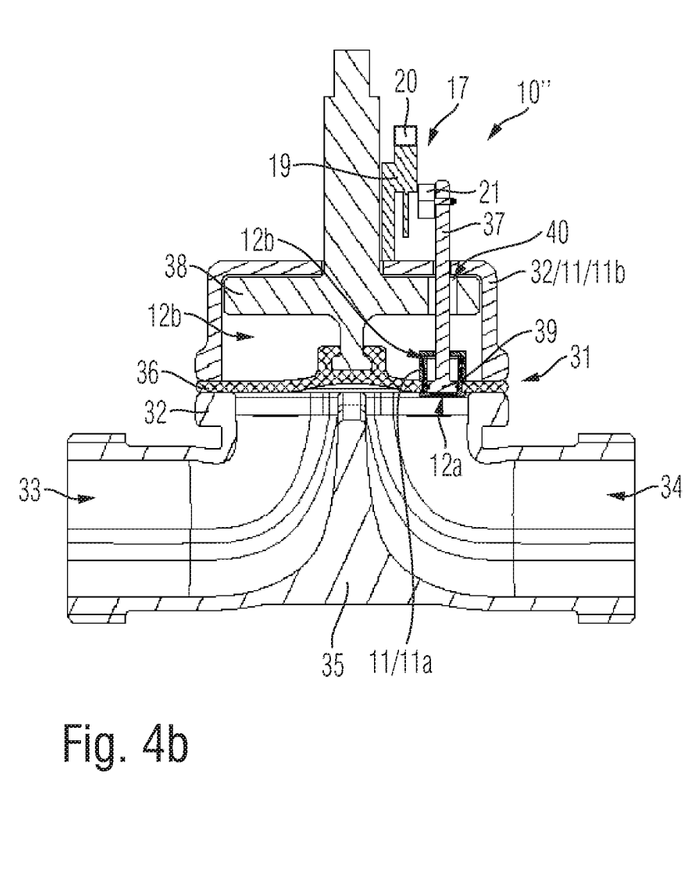
FIG. 4b shows the assembly of FIG. 4a in a second status of the leakage detection device when the stop valve is opened.

FIGS. 4*a*, 4*b* show a leakage detection device 10" for detecting a water leakage in a water pipe of a water system according to another embodiment of the invention. The leakage detection device 10" of FIGS. 4*a*, 4*b* is an integral element of a stop valve 31. The stop valve 31 of FIGS. 4*a*. 4*b* is a weir type diaphragm valve having a housing 32 with an inlet chamber 33, an outlet chamber 34 and a weir type wall 35 between the inlet chamber 33, an outlet chamber 34.

When the stop valve 31 of FIGS. 4*a*, 4*b* is closed, a diaphragm 36 is pressed against the weir type wall 35 (see FIG. 4*a*) thereby stopping a water flow through the stop valve 31. When the diaphragm 36 is lifted up from the weir type wall 35 (see FIG. 4*b*), the stop valve 31 is opened thereby allowing a water flow through the stop valve 31.

The leakage detection device 10" of FIGS. 4*a*, 4*b* comprises a housing 11. A first housing part 11*a* of the housing 11 of the leakage detection device 10" that provides the first interior chamber 12*a* and the stagnation volume of the leakage detection device 10" is provided by a cage-like element integrated into the diaphragm 36. The stagnation volume is connected with the outlet chamber 34 of the stop valve 31 through an opening within said cage-like element being integral with the diaphragm 36.

A second housing part 11*b* of the housing 11 of the leakage detection device 10" is provided by the valve housing 32 of the stop valve 31.

The leakage detection device 10" further provides a second interior chamber 12*b*, said second interior chamber 12*b* being separated from the first interior chamber 12*a* by a piston 39 and by the cage-like element being integral with the diaphragm 36. Said second interior chamber 12*b* comprises a first section being delimited by the diaphragm 36, the valve housing 32 and the cage-like element being integral with the diaphragm 36.

Said first section of the second interior chamber 12*b* accommodates a section of a stem 37 connected to the piston 39 and further accommodates an element 38 acting on the diaphragm 36 in such a way that a force provided through said element 38 on the diaphragm 36 tends to push the diaphragm 36 against the wall 35 of the valve housing 32. The element 38 comprises an opening through which the stem 37 penetrates.

The element 38 is pressed against the diaphragm 36 by an actuator (not shown), e.g. by a pneumatic or hydraulic actuator, or by a motor or by a solenoid or by a handle unit.

Said second interior chamber 12*b* further comprises a second section being delimited by the cage-like element being integral with the diaphragm 36 and by the piston 39. Said second section of the second interior chamber 12*b* accommodates a section of the stem 37. Said second section of the second interior chamber 12*b* further accommodates an actuation element (not shown) acting on the piston 39 in such a way that a force provided through said actuation element tends to push the piston 39 in the direction of the first interior chamber 11*a* against or into the stagnation volume. Said actuation element may be a compressible actuation element like a spring supported with a first end against the piston 39 carried by the stem 37 and supported with a second end against said first housing part 11*a*, namely outside of the first interior chamber 12*a* and thereby outside of the stagnation volume.

The leakage detection device 10" of FIGS. 4a, 4b comprises the sensor unit 17 sensing the movement of the stem 37 and detecting from the movement of the stem 37 the water leakage. The sensor unit 17 comprises the sensor element 19 for sensing the time-dependent movement of the stem 37 and a processing element 20 for detecting from the time-dependent movement of the stem 37 the water leakage.

In the embodiment shown in FIGS. 4a, 4b, the the sensor element 19 is provided by a Hall sensor. The Hall sensor senses the movement of the element 21 attached to the stem 37.

The processing element 20 is a microcontroller detecting from the signal provided by the Hall sensor the water leakage.

If there is a leakage, the stagnation volume within the first interior chamber 12a will become smaller and the piston 39 together with the stem 37 will be pushed to compensate the water leakage. If no leakage is present, the water within the stagnation volume provided by the first interior chamber 12a will stay within the first interior chamber 12a and the stagnation volume is constant. If a leakage is present, the water within the stagnation volume provided by the first interior chamber 12a will flow out of the first interior chamber 12a and the stagnation volume is not constant but will become smaller. The piston 39 will be pushed to compensate water leakage. This causes a time-dependent movement of the stem 37 and thereby of the element 21 relative to the sensor element 19. The movement of the element 21 relative to the sensor element 19 is sensed, wherein on basis of said time-dependent movement the water leakage becomes detected.

In all shown embodiments the sensor element 19 is provided by a Hall sensor. The sensor element 19 can also be provided by a Reed-Contact sensor or a photocell sensor or potentiometer sensor or micro switch or a capacitive sensor or by an inductive sensor or the like.

In the embodiments of FIGS. 1a, 1b and 2a. 2b and 4a, 4c, the stagnation volume provided by the first interior chamber 12a of first housing part 11a is connected to the outlet chamber 24b. 30b of the stop valve 23, 27 or is provided by the outlet chamber 34 of the stop valve 31. This allows the detection of leakage within a water pipe connected to outlet chamber 24b, 30b, 34 of the stop valve 23, 27, 31 when the stop valve 23, 27, 31 is closed.

It is also possible that the stagnation volume provided by the first interior chamber 12a of first housing part 11a is connected to the inlet chamber 24a, 30a of the stop valve 23, 27 or is provided by the inlet chamber 33 of the stop valve 31. This allows the detection of leakage within a water pipe connected to the inlet chamber 24a, 30a. 33 of the stop valve 23, 27, 31 when a stop valve (not shown) being positioned upstream of the stop valve 23, 27, 31 is closed.

In the embodiments of FIGS. 1a, 1b and 2a, 2b and 4a, 4b, the water leakage detection device is an integral element of a stop valve 23, 27, 31.

In the embodiment of FIG. 3a, 3b the water leakage detection device is provided as a separate device being connectable to the water pipe of the water system through the connection thread. In the embodiment of FIG. 3a, 3b the leakage detection device can be used as a retrofit unit for devices installed within a water system.

In all shown embodiments of FIGS. 1a. 1b and 2a. 2b and 3a, 3b and 4a. 4b, the actuation element 16 acting on the diaphragm 14 or the piston 29, 39 is provided by a compressible element and the movement of the stein 15, 37 is used as sensed parameter being representative of the movement of the diaphragm 14 or the piston 29, 39.

Instead, the actuation element 16 acting on the diaphragm 14 or the piston 29, 39 can be provided by a drive unit driven by a control variable, like an electrical motor or a solenoid actuator driven by an electrical current.

Such a drive unit can act directly on the diaphragm 14 or the piston 29, 39.

Alternatively, such a drive unit can act indirectly on the diaphragm 14 or the piston 29, 39, especially through the stem 15, 37.

The control variable driving the drive unit can be used as parameter being representative of the force provided by the actuation element, and the water leakage detection can be based on said parameter. In case the drive unit is an electrical motor or a solenoid actuator, an electrical current driving the electrical motor or the solenoid actuator is used as control variable and the detection of leakage can be based on the time-dependent change of said parameter.

The processing element is adapted to analyse said parameter being representative of the force provided by the actuation element 16 as a function of time in such a way that if the rate or velocity of the change of said time-dependent parameter is below a first threshold, the processing element detects that neither a water leakage nor a regular water consumption is present.

However, if the rate or velocity of the change of said time-dependent parameter is above the first threshold but below a second threshold, the processing element detects that a water leakage is present.

Further, if the rate or velocity of the change of said time-dependent parameter is above the second threshold, the processing element detects that a regular water consumption is present.

By changing the first threshold, the sensitivity can be adjusted. If the diaphragm 14 or the piston 29 39 moves due to a water leakage, this movement will have a measurable effect to the control variable driving the drive unit. This leakage detection is preferably used if the drive unit acts directly on the diaphragm 14 or the piston 29, 39 without having a stem present.

Alternatively or in addition, the leakage detection can make use of the movement of the stem as a parameter being representative of the movement of the diaphragm or the piston. This is preferably the case if the drive unit acts indirectly on the diaphragm 14 or the piston 29, 39 through the stem.

The leakage detection device 10, 10', 10" takes into account that water is not compressible, and that leakages can be detected by measuring the change of the water stagnation volume. If the stop valve assigned to the water pipe is closed and there is no leakage in the water pipe, the stagnation volume will not change. In case of a leakage, the stagnation volume will become smaller and the diaphragm 14, 26 or piston 29 will be pushed against or into the stagnation volume to compensate the leakage. The novel water leakage detection device 10, 10', 10" provides a leakage detection in a simple, reliable and cost-effective manner.

LIST OF REFERENCES CITED 10 leakage detection device
10' leakage detection device
10" leakage detection device
11 housing
11a first housing part
11b second housing part
12a first interior chamber
12b second interior chamber 13 opening
14 diaphragm
15 stem
16 actuation element
17 sensor unit
18 plate
19 sensor element
20 processing element
21 element
22 stop member
23 stop valve
24 valve housing
24a inlet chamber
24b outlet chamber
25 valve body
26 handle
27 stop valve
28 valve body
29 piston
30 valve housing
30a inlet chamber
30b outlet chamber
31 stop valve
32 valve housing
33 inlet chamber
34 outlet chamber
35 wall
36 diaphragm
37 stem
38 element
39 piston
40 opening

What is claimed is:

1. A leakage detection device for detecting a water leakage in a water pipe of a water system, comprising
 a first interior chamber, the first interior chamber being connectable to the water pipe in such a way that the first interior chamber receives a stagnation volume of the water when the water flow through the water pipe is stopped;
 a second interior chamber, the second interior chamber being separated from the first interior chamber by a diaphragm or by a piston;
 an actuation element configured to provide a force acting on the diaphragm or the piston that tends to move the diaphragm or the piston in a direction of the first interior chamber against or into the stagnation volume;
 a sensor unit configured to sense a parameter being representative of the movement of the diaphragm or the piston and/or for sensing a parameter being representative of the force provided by the actuation element, wherein the sensor unit comprises:
  a sensor element configured to sense the parameter being representative of movement of the diaphragm or the piston and/or the parameter being representative of the force provided by the actuation element;
  a processing element, wherein the processing element is configured to analyse the parameter being representative of movement of the diaphragm or the piston and/or the parameter being representative of the force provided by the actuation element as a function of time in such a way that:
   if the rate or velocity of the change of the or each time-dependent parameter within a defined time interval is below a first threshold, then the processing element detects that neither a water leakage nor a regular water consumption is present,
   if the rate or velocity of the change of the or each time-dependent parameter within the defined time interval is above the first threshold but below a second threshold, then the processing element detects that a water leakage is present, and
   if the rate or velocity of the change of the or each time-dependent parameter within the defined time interval is above the second threshold, then the processing element detects that a regular water consumption is present.

2. The leakage detection device of claim 1, wherein:
 the second chamber accommodates a stem connected to the diaphragm or the piston; and
 the sensor unit is configured to sense the parameter being representative of the movement of the diaphragm or the piston or the movement of the stem and detects from the movement of the stem the water leakage.

3. The leakage detection device of claim 1, wherein a decrease in the stagnation volume within the first interior chamber and movement of the diaphragm or the piston by the actuation element to compensate for the water leakage volume is configured to cause a change in the parameter being representative of the movement of the diaphragm or the piston and/or a change in the parameter being representative of the force provided by the actuation element, wherein the processing element is configured to detect the water leakage on basis of the or each of the parameter changes and thereby on the basis of the stagnation volume change.

4. The leakage detection device of claim 1, wherein the leakage detection device is an integral element of a stop valve.

5. The leakage detection device of claim 1, wherein the leakage detection device is a separate device being connectable to the water pipe of the water system.

6. The leakage detection device of claim 1, further comprising a housing, wherein the housing defines at least part of the first interior chamber and the second interior chamber.

7. The leakage detection device of claim 1, wherein the actuation element is configured to act directly on the diaphragm or the piston or indirectly on the diaphragm or the piston.

8. The leakage detection device of claim 1, wherein the sensor unit has a sensitivity, and the sensitivity is adjustable.

9. The leakage detection device of claim 1, wherein the actuation element acting on the diaphragm or the piston is a compressible element or a drive unit.

10. The leakage detection device of claim 9, wherein the actuation element acting on the diaphragm or the piston is the drive unit, and wherein the drive unit is an electric or magnetic drive unit driven by a control variable, wherein the control variable driving the drive unit is used as the parameter that is representative of the force provided by the actuation element.

11. The leakage detection device of claim 9, wherein the actuation element acting on the diaphragm or the piston is the compressible element, and the compressible element is provided by a spring, an elastomer cushion or an air cushion.

12. The leakage detection device of claim 11, wherein the compressible element is supported against the diaphragm or the piston and against a housing of the leakage detection device.

13. The leakage detection device of claim 11, wherein the compressible element is compressible by the stagnation volume of the water accommodated within the first interior chamber and is configured to provide a force on the diaphragm or the piston depending from a compression of the same.

14. A water system, comprising
a water pipe for water;
a stop valve positioned in line with the water pipe, wherein a flow of the water through the water pipe is stopped when the stop valve is closed and wherein the flow of the water through the water pipe is allowed when the stop valve is opened; and
a leakage detection device having a chamber in fluid communication with the water pipe when the stop valve is closed such that the chamber receives a stagnation volume of the water, wherein the leakage detection device is configured to:
apply a force when the stop valve is closed in an attempt to move a diaphragm or a piston to reduces the volume of the chamber; and
detect a leak in the water pipe based at least in part on the movement of the diaphragm or a piston,
wherein the leakage detection device comprises a sensor unit configured to sense a parameter representative of the movement of the diaphragm or the piston and/or a parameter representative of the force, wherein the sensor unit comprises:
a sensor element configured to sense the parameter representative of movement of the diaphragm or the piston and/or the parameter representative of the force;
a processing element configured to analyse the parameter representative of movement of the diaphragm or the piston and/or the parameter representative of the force as a function of time in such a way that:
if the rate or velocity of the change of the or each time-dependent parameter within a defined time interval is below a first threshold, then the processing element detects that neither a water leakage nor a regular water consumption is present,
if the rate or velocity of the change of the or each time-dependent parameter within the defined time interval is above the first threshold but below a second threshold, then the processing element detects that a water leakage is present, and
if the rate or velocity of the change of the or each time-dependent parameter within the defined time interval is above the second threshold, then the processing element detects that a regular water consumption is present.

15. The water system of claim 14, wherein the leakage detection device is configured to detect movement of the diaphragm or the piston directly or indirectly.

16. The water system of claim 14, wherein the force is applied by a spring.

17. A stop valve, comprising:
a valve housing defining a first chamber and a second chamber;
a valve member situated in the valve housing, the valve member configured to allow flow between the first chamber and the second chamber when the valve member is in an open position, and configured to stop flow between the first chamber and the second chamber when the stop valve is in a closed position;
a leakage detection device having a leakage detection chamber in fluid communication with the first chamber such that the leakage detection chamber receives a stagnation volume of the flow when the stop valve is in the closed position, wherein the leakage detection device comprises:
a diaphragm or a piston in fluid communication with the leakage detection chamber;
an actuation element configured to provide a force acting on the diaphragm or the piston in a direction of the leakage detection chamber and against or into the stagnation volume; and
a sensor unit configured to detect either directly or indirectly movement of the diaphragm or the piston over time, the sensor unit configured to sense a parameter representative of the movement of the diaphragm or the piston and/or a parameter representative of the force, wherein the sensor unit comprises:
a sensor element configured to sense the parameter representative of movement of the diaphragm or the piston and/or the parameter representative of the force;
a processing element configured to analyse the parameter representative of movement of the diaphragm or the piston and/or the parameter representative of the force as a function of time in such a way that:
if the rate or velocity of the change of the or each time-dependent parameter within a defined time interval is below a first threshold, then the processing element detects that neither a water leakage nor a regular water consumption is present,
if the rate or velocity of the change of the or each time-dependent parameter within the defined time interval is above the first threshold but below a second threshold, then the processing element detects that a water leakage is present, and
if the rate or velocity of the change of the or each time-dependent parameter within the defined time interval is above the second threshold, then the processing element detects that a regular water consumption is present.

18. The stop valve of claim 17, wherein the valve housing defines at least part of the leakage detection chamber.

* * * * *